United States Patent
Subba et al.

(10) Patent No.: US 10,412,037 B2
(45) Date of Patent: Sep. 10, 2019

(54) METHODS AND SYSTEMS FOR PROVIDING NOTIFICATIONS TO USERS OF A SOCIAL NETWORKING SERVICE

(71) Applicant: FACEBOOK, INC., Menlo Park, CA (US)

(72) Inventors: Rajen Subba, Redwood City, CA (US); Antoine Raux, Cupertino, CA (US); Jian Yang, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 208 days.

(21) Appl. No.: 15/439,652

(22) Filed: Feb. 22, 2017

(65) Prior Publication Data

US 2018/0241713 A1 Aug. 23, 2018

(51) Int. Cl.
*H04L 12/58* (2006.01)

(52) U.S. Cl.
CPC ............... *H04L 51/32* (2013.01); *H04L 51/20* (2013.01); *H04L 51/24* (2013.01)

(58) Field of Classification Search
CPC .......... H04L 51/32; H04L 51/20; H04L 51/24
See application file for complete search history.

(56) References Cited

U.S. PATENT DOCUMENTS

| | | | | |
|---|---|---|---|---|
| 2009/0254840 A1* | 10/2009 | Churchill | ............... | G06F 3/0481 715/753 |
| 2012/0030210 A1* | 2/2012 | Sankhla | ............ | G06F 17/30699 707/741 |
| 2014/0156746 A1* | 6/2014 | Wheatley | ................. | H04L 67/22 709/204 |
| 2015/0227579 A1* | 8/2015 | Cantarero | ......... | G06F 17/30616 707/708 |
| 2015/0334072 A1* | 11/2015 | Agarwal | ................. | H04L 51/24 715/753 |
| 2016/0042069 A1* | 2/2016 | Lee-Goldman | ............................ | G06F 17/30864 707/706 |
| 2016/0155171 A1* | 6/2016 | Isaacson | ............ | G06Q 30/0633 705/26.41 |
| 2016/0337305 A1* | 11/2016 | Liu | ......................... | H04L 51/32 |

* cited by examiner

*Primary Examiner* — Chris Parry
*Assistant Examiner* — Soe M Hlaing
(74) *Attorney, Agent, or Firm* — Morgan, Lewis & Bockius LLP

(57) ABSTRACT

A method of providing notifications to users of a social networking service includes determining a user intent associated with a post from a user on the social networking service, based at least in part on content of the post. The method further includes generating a first notification of the user intent associated with the post and selecting a plurality of users of the social networking service to receive the first notification. The method further includes providing the first notification to the plurality of users, and after providing the first notification to the plurality of users: (1) receiving one or more responses to the first notification from one or more users of the plurality of users, the one or more responses including information responsive to the first notification, and (2) providing the information responsive to the first notification to the user.

20 Claims, 10 Drawing Sheets

METHODS AND SYSTEMS FOR PROVIDING NOTIFICATIONS TO USERS OF A SOCIAL NETWORKING SERVICE

TECHNICAL FIELD

This relates generally to providing notifications, including but not limited to providing notifications to users of a social networking service.

BACKGROUND

Social networking services provide a convenient means for users to share information. Certain users may possess information (e.g., information such as a review of a local business or tourist attraction) that other users may find helpful or useful. However, connecting users that possess useful information with other users seeking the useful information can be a challenging process for the social networking services.

SUMMARY

Accordingly, there is a need for methods and systems for notifying users of a social networking service that possess information sought by other users. Determining a user intent associated with a post from a user of the social networking service, generating a first notification of the user intent associated with the post, and providing the first notification to a plurality of users (e.g., users that may possess useful information associated with the user intent) can improve the sharing of useful information on the social networking service. Such methods and systems provide the social networking service with processes to provide information (e.g., relevant, useful information) responsive to the first notification to the user.

In accordance with some embodiments, a method is performed at a server system having one or more processors and memory storing instructions for execution by the processors. The method includes determining a user intent associated with a post from a user on a social networking service, based at least in part on content of the post. The method further includes generating a first notification of the user intent associated with the post and selecting a plurality of users of the social networking service to receive the first notification. The method further includes providing the first notification to the plurality of users, and after providing the first notification to the plurality of users: (1) receiving one or more responses to the first notification from one or more users of the plurality of users, the one or more responses including information responsive to the first notification, and (2) providing the information responsive to the first notification to the user.

In accordance with some embodiments, a server system includes one or more processors/cores and memory storing one or more programs configured to be executed by the one or more processors/cores. The one or more programs include instructions for performing the operations of the method described above. In accordance with some embodiments, a non-transitory computer-readable storage medium has stored therein instructions that, when executed by one or more processors/cores of a server system, cause the server system to perform the operations of the method described above.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first notification could be termed a second notification, and, similarly, a second notification could be termed a first notification, without departing from the scope of the various described embodiments. The first notification and the second notification are both notifications, but they are not the same notifications.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
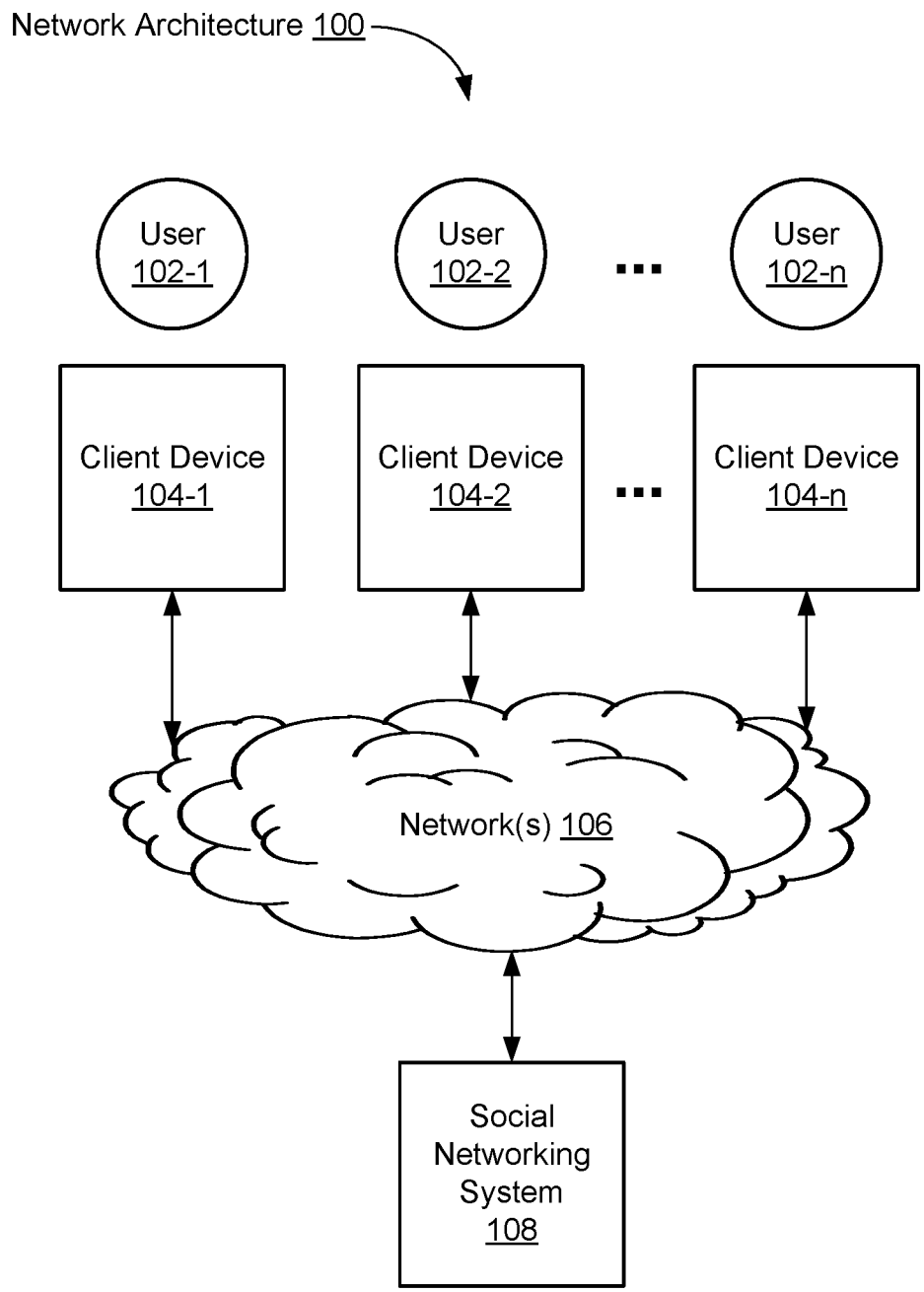
FIG. 1 is a block diagram illustrating an exemplary network architecture of a social network, in accordance with some embodiments.

FIG. 1 is a block diagram illustrating an exemplary network architecture of a social network in accordance with some embodiments. The network architecture 100 includes a number of client devices (also called "client systems," "client computers," or "clients") 104-1, 104-2, . . . 104-n communicably connected to a social networking system 108 by one or more networks 106.

In some embodiments, the client devices 104-1, 104-2, . . . 104-n are computing devices such as smart watches, personal digital assistants, portable media players, smart phones, tablet computers, 2D gaming devices, 3D gaming devices, virtual reality devices, laptop computers, desktop computers, televisions with one or more processors embedded therein or coupled thereto, in-vehicle information systems (e.g., an in-car computer system that provides navigation, entertainment, and/or other information), or other appropriate computing devices that can be used to communicate with an electronic social networking system and other computing devices (e.g., via the electronic social networking system). In some embodiments, the social networking system 108 is a single computing device such as a computer server, while in other embodiments, the social networking system 108 is implemented by multiple computing devices working together to perform the actions of a server system (e.g., cloud computing). In some embodiments, the network 106 is a public communication network (e.g., the Internet or a cellular data network), a private communications network (e.g., private LAN or leased lines), or a combination of such communication networks.

Users 102-1, 102-2, . . . 102-n employ the client devices 104-1, 104-2, . . . 104-n to access the social networking system 108 and to participate in a social networking service. For example, one or more of the client devices 104-1, 104-2, . . . 104-n execute web browser applications that can be used to access the social networking service. As another example, one or more of the client devices 104-1, 104-2, . . . 104-n execute software applications that are specific to the one or more social networks (e.g., social networking "apps", such as a Facebook social networking application, a messaging application, etc.).

Users interacting with the client devices 104-1, 104-2, . . . 104-n can participate in the social networking service provided by the social networking system 108 by providing and/or consuming (e.g., posting, writing, viewing, publishing, broadcasting, promoting, recommending, sharing) information, such as text comments (e.g., statuses, updates, announcements, replies, location "checks-in," private/group messages), digital content (e.g., photos (i.e., images), videos, audio files, links, documents), and/or other electronic content. In some embodiments, users provide information to a page, group, message board, feed, and/or user profile of a social networking service provided by the social networking system 108. Users of the social networking service can also annotate information posted by other users of the social networking service (e.g., endorsing or "liking" a posting of another user, commenting on a posting by another user, or sharing a posting of another user).

In some embodiments, information can be posted on a user's behalf by systems and/or services external to the social network or the social networking system 108. For example, the user may post a review of a movie to a movie review website, and with proper permissions that website may cross-post the review to the social network on the user's behalf. In another example, a software application executing on a mobile client device, with proper permissions, may use a global navigation satellite system (GNSS) (e.g., global positioning system (GPS), GLONASS, etc.) or other geo-location capabilities (e.g., Wi-Fi or hybrid positioning systems) to determine the user's location and update the social network with the user's location (e.g., "At Home," "At Work," "In San Francisco, Calif.," etc.), and/or update the social network with information derived from and/or based on the user's location. Users interacting with the client devices 104-1, 104-2, . . . 104-n can also use the social network provided by the social networking system 108 to define groups of users. Users interacting with the client devices 104-1, 104-2, . . . 104-n can also use the social network provided by the social networking system 108 to communicate (e.g., using a messaging application or built-in feature) and collaborate with each other.

In some embodiments, the network architecture 100 may also include third-party servers (not shown). In some embodiments, third-party servers are associated with third-party service providers that provide services and/or features to users of a network.

Figure 2A:
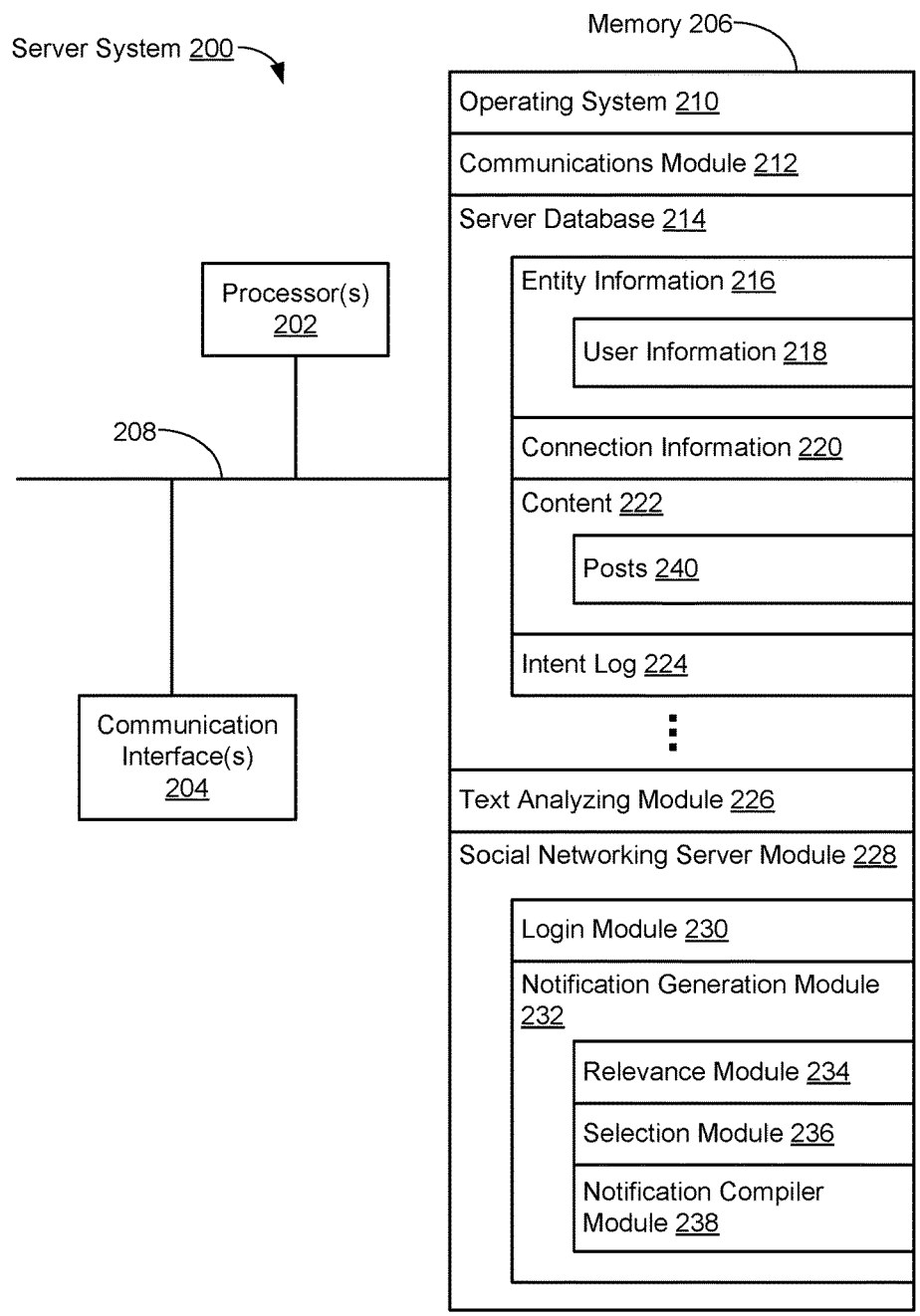
FIG. 2A is a block diagram illustrating an exemplary server system, in accordance with some embodiments.

FIG. 2A is a block diagram illustrating an exemplary server system 200 in accordance with some embodiments. In some embodiments, the server system 200 is an example of a social networking system 108 (FIG. 1). The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 2B:
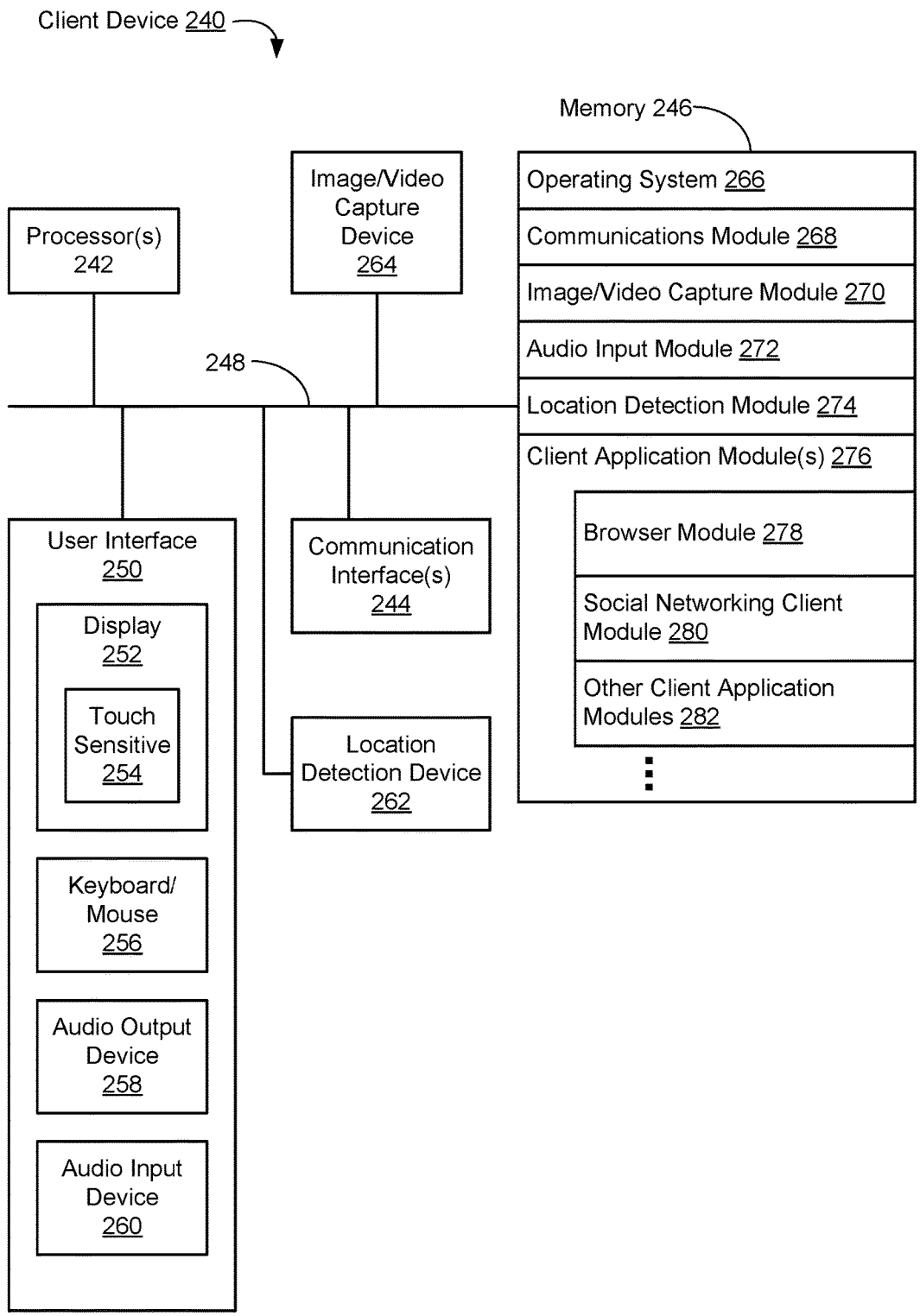
FIG. 2B is a block diagram illustrating an exemplary client device, in accordance with some embodiments.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer readable storage medium. In some embodiments, memory 206 or the computer readable storage medium of memory 206 stores the following programs, modules, and data structures, or a subset or superset thereof:

- an operating system 210 that includes procedures for handling various basic system services and for performing hardware-dependent tasks;
- a network communication module 212 that is used for connecting server system 200 (e.g., social networking system 108, FIG. 1) to other computers (e.g., client devices 104-1, 104-2, . . . 104-n, and/or third party servers) via the one or more communication network interfaces 204 (wired or wireless) and one or more communication networks, such as the Internet, cellular telephone networks, mobile data networks, other wide area networks, local area networks, metropolitan area networks, and so on;

a server database 214 for storing data associated with the social networking service, such as:

entity information 216, such as user information 218, which includes content items (e.g., images, videos, etc.) and other user information (e.g., age of user, sex of the user, etc.);

connection information 220;

user content 222; and intent log 224;

text analyzing module 226 that operates upon text provided by users of the social networking service (e.g., text in posts, responses, etc.); and a social networking server module 228 for providing social networking services and related features (e.g., in conjunction with social networking client module 280 on the client device 240, FIG. 2B), which includes:

a login module 230 for logging a user 102 at a client device 104 into the social networking system 108; and a notification generator module 232 for generating a notification (e.g., a first notification) based on a post from a user 102-1, providing the notification to other users 102-2 . . . 102-n, and providing received responses (or information contained therein) to the user 102-1, which includes:

a relevance module 234 for determining a degree of relevance of received responses to the post from the user;

a selection module 236 for selecting users to receive the notification; and a notification compiler module 238 for compiling the received responses and presenting one or more of the received responses (or information contained therein) to the user 102.

The server database 214 stores data associated with the server system 200 in one or more types of databases, such as text, graph, dimensional, flat, hierarchical, network, object-oriented, relational, and/or XML databases.

In some embodiments, the server database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social networking service. In some embodiments, the nodes also include pointers or references to other objects, data structures, or resources for use in rendering content in conjunction with the rendering of the pages corresponding to the respective nodes at clients 104.

Entity information 216 includes user information 218, such as pictures associated with the user (e.g., images where the user has been tagged or otherwise identified), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information. In some embodiments, the user information may include other information, such as likes and comments, associated with, for example, profile pictures of the user (or other photos of the user).

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Palo Alto, Calif., USA) for one or more digital photos. In some embodiments, the resource is located in the social networking system 108 (e.g., in content 222) or on an external server, such as a third-party server (not shown).

In some embodiments, connection information 220 includes information about the relationships between entities in server database 214. In some embodiments, connection information 220 includes information about edges that connect pairs of nodes in a graph database. In some embodiments, an edge connecting a pair of nodes represents a relationship between the pair of nodes (e.g., also referred to herein as a contact).

In some embodiments, an edge includes or represents one or more data objects or attributes that correspond to the relationship between a pair of nodes. For example, when a first user indicates that a second user is a "friend" of the first user, the social networking system 108 may transmit a "friend request" to the second user. If the second user confirms the "friend request," the social networking system 108 may create and store an edge connecting the first user's user node and the second user's user node in a graph database as connection information 220 that indicates that the first user and the second user are friends (also referred to herein as a direct connection). In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon (e.g., an affordance). After the user clicks one of these icons, the social networking system 108 may create a "like" edge, "check in" edge, a "favorites" edge, etc. in response to the corresponding user action. As another example, the user may listen to a particular song using a particular application (e.g., an online music application). In this case, the social networking system 108 may create a "listened" edge and a "used" edge between the user node that corresponds to the user and the entity nodes that correspond to the song and the application, respectively, to indicate that the user listened to the song and used the application. In addition, the social networking system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., script for API calls), podcasts, links, and the like. In some embodiments, content 222 includes posts 240 (e.g., previous posts and/or current posts) along with associated notifications and responses.

In some embodiments, intent log 224 includes determined user intents associated with posts and responses. For example, the intent log 224 may include determined intents for respective posts.

FIG. 2B is a block diagram illustrating an exemplary client device 240, in accordance with some embodiments. The client device 240 is an example of the one or more client devices 104-1, 104-2, . . . 104-n (FIG. 1). The client device 240 typically includes one or more processing units (processors or cores) 242, one or more network or other communications interfaces 244, memory 246, and one or more communication buses 248 for interconnecting these components. The communication buses 248 optionally include circuitry (sometimes called a chipset) that interconnects and controls communications between system components. The client device 240 includes a user interface 250. The user interface 250 typically includes a display device 252. In some embodiments, the client device 240 includes inputs such as a keyboard, mouse, and/or other input buttons 256. Alternatively or in addition, in some embodiments, the display device 252 includes a touch-sensitive surface 254, in which case the display device 252 is a touch-sensitive display. In some embodiments, the touch-sensitive surface 254 is configured to detect various swipe gestures (e.g., continuous gestures in vertical and/or horizontal directions) and/or other gestures (e.g., single/double tap). In client devices that have a touch-sensitive display 252, a physical keyboard is optional (e.g., a soft keyboard may be displayed when keyboard entry is needed). The user interface 250 also includes an audio output device 258, such as speakers or an audio output connection connected to speakers, earphones, or headphones. Furthermore, some client devices 240 use a microphone and voice recognition to supplement or replace the keyboard. Optionally, the client device 240 includes an audio input device 260 (e.g., a microphone) to capture audio (e.g., speech from a user). Optionally, the client device 240 includes a location detection device 262, such as a GNSS (e.g., GPS, GLONASS, etc.) or other geo-location receiver, for determining the location of the client device 240. The client device 240 also optionally includes an image/video capture device 264, such as a camera and/or a webcam.

In some embodiments, the client device 240 includes one or more optional sensors (e.g., gyroscope, accelerometer) for detecting motion and/or a change in orientation of the client device. In some embodiments, the detected motion and/or orientation of the client device 240 (e.g., the motion/change in orientation corresponding to a user input produced by a user of the client device) is used to manipulate an interface (or content within the interface) displayed on the client device 240. In some embodiments, the one or more optional sensors may include an optical projection sensor for projecting an interface displayed on the client device 240 in 3D (e.g., project 3D hologram). Moreover, a user may manipulate the interface displayed on the client device 240 by interacting with the projected holographic 3D display.

Memory 246 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 246 may optionally include one or more storage devices remotely located from the processor(s) 242. Memory 246, or alternately the non-volatile memory device(s) within memory 246, includes a non-transitory computer-readable storage medium. In some embodiments, memory 246 or the computer-readable storage medium of memory 246 stores the following programs, modules, and data structures, or a subset or superset thereof:

- an operating system 266 that includes procedures for handling various basic system services and for performing hardware-dependent tasks;
- a network communication module 268 that is used for connecting the client device 240 to other computers via the one or more communication network interfaces 244 (wired or wireless) and one or more communication networks, such as the Internet, cellular telephone networks, mobile data networks, other wide area networks, local area networks, metropolitan area networks, and so on;
- an image/video capture module 270 (e.g., a camera module) for processing a respective image or video captured by the image/video capture device 264, where the respective image or video may be sent or streamed (e.g., by a client application module 276) to the social networking system 108;
- an audio input module 272 (e.g., a microphone module) for processing audio captured by the audio input device 260, where the respective audio may be sent or streamed (e.g., by a client application module 276) to the social networking system 108;
- a location detection module 274 (e.g., a GPS, Wi-Fi, or hybrid positioning module) for determining the location of the client device 240 (e.g., using the location detection device 262) and providing this location information for use in various applications (e.g., social network client module 280); and
- one or more client application modules 276, including the following modules (or sets of instructions), or a subset or superset thereof:
  - a web browser module 278 (e.g., Internet Explorer or Edge by Microsoft, Firefox by Mozilla, Safari by Apple, or Chrome by Google) for accessing, viewing, and interacting with web sites;
  - a social network module 280 for providing an interface to a social networking service (e.g., a social networking service provided by social networking system 108) and related features, and for loading (e.g., within the interface for the social network module 280) pages associated with third-party service providers (e.g., to conduct transactions with the third-party service providers); and/or
  - optional client application modules 282, such as applications for word processing, calendaring, mapping, weather, stocks, time keeping, virtual digital assistant, presenting, number crunching (spreadsheets), drawing, instant messaging, e mail, telephony, video conferencing, photo management, video management, a digital music player, a digital video player, 2D gaming, 3D gaming, virtual reality, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 246 store a subset of the modules and data structures identified above. Furthermore, memory 206 and/or 246 optionally store additional modules and data structures not described above.

Figure 3A:
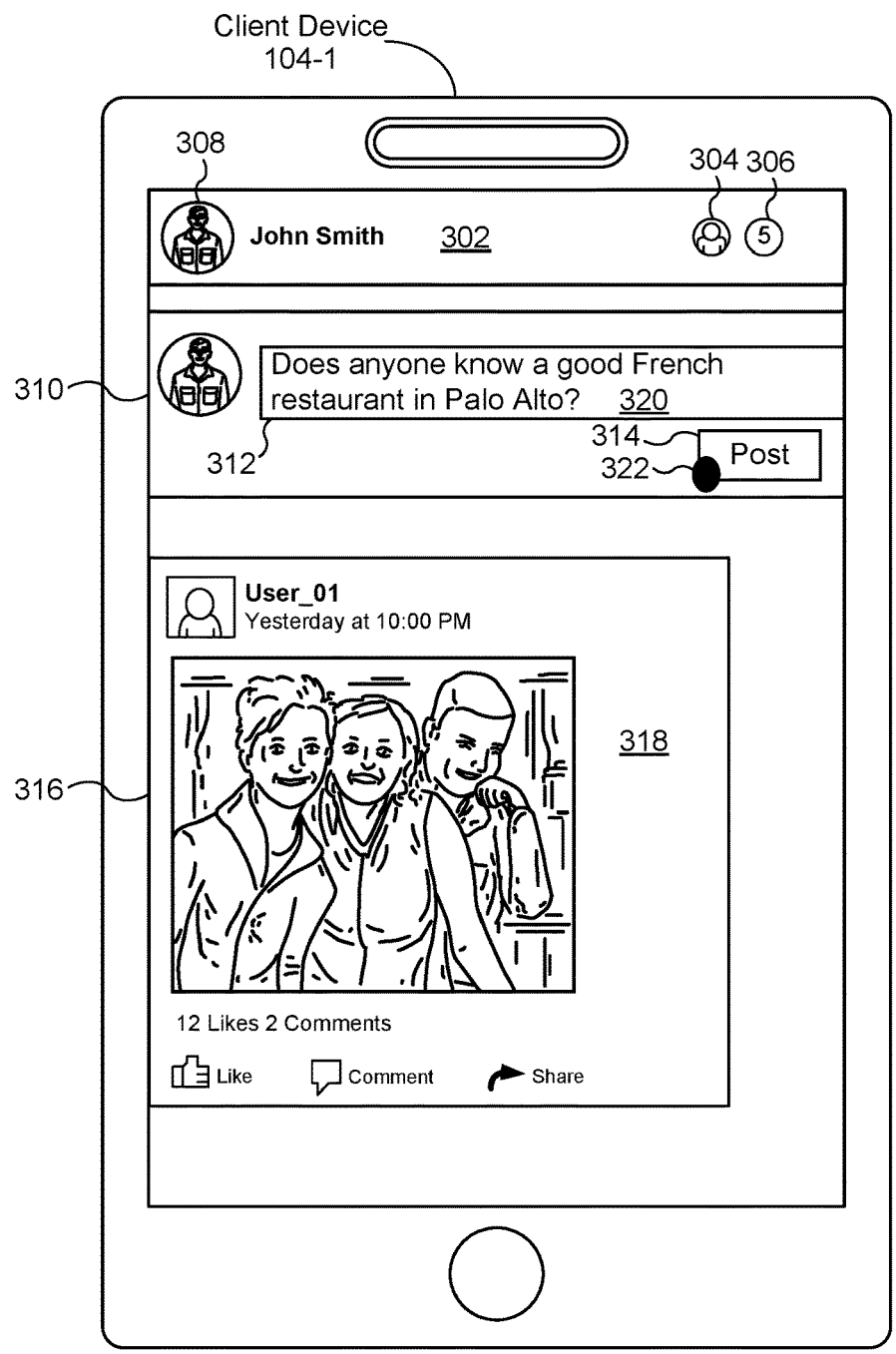
FIGS. 3A-3F illustrate exemplary graphical user interfaces (GUIs) for providing notifications to users of a social networking system on a client device, in accordance with some embodiments.
Figure 3C:
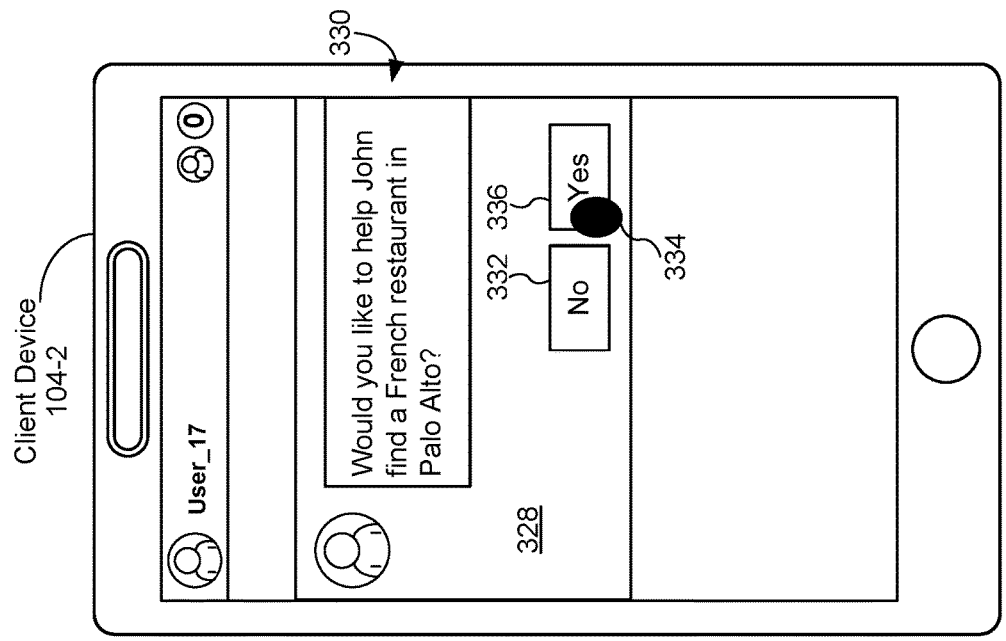
Figure 3B:
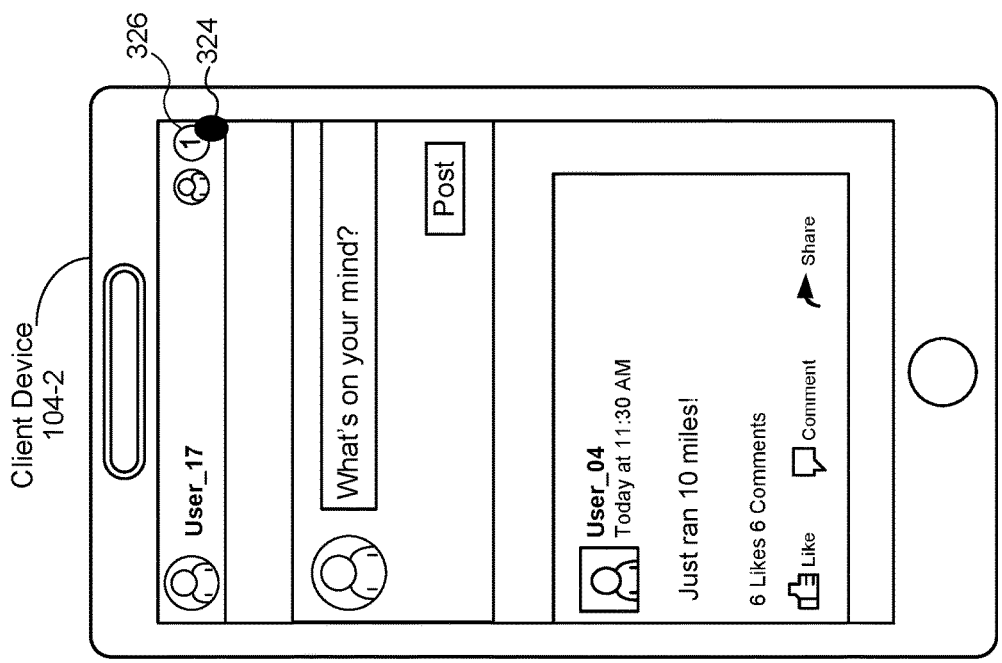
Figure 3E:
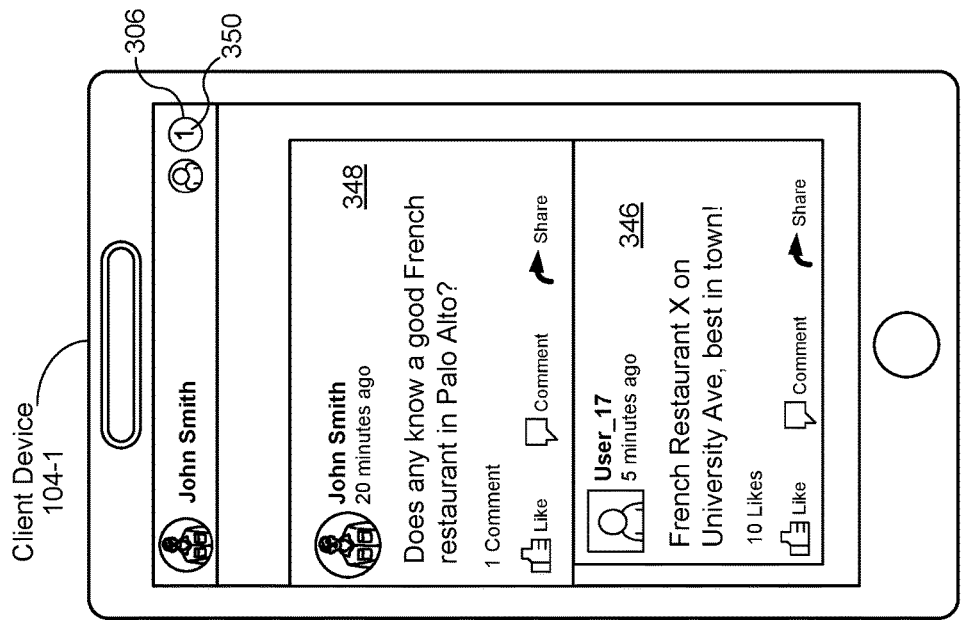
Figure 3D:
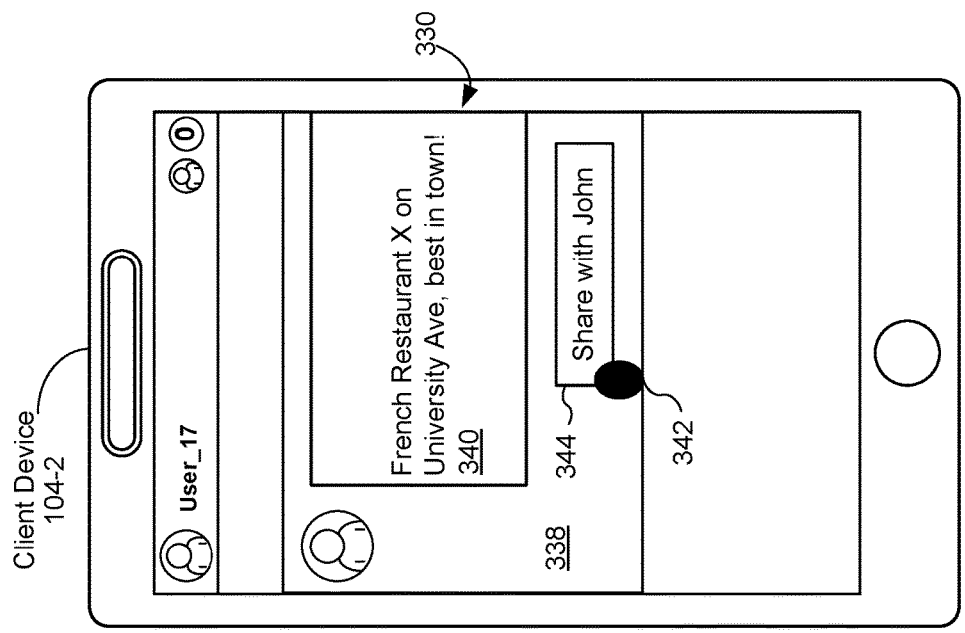
Figure 3F:
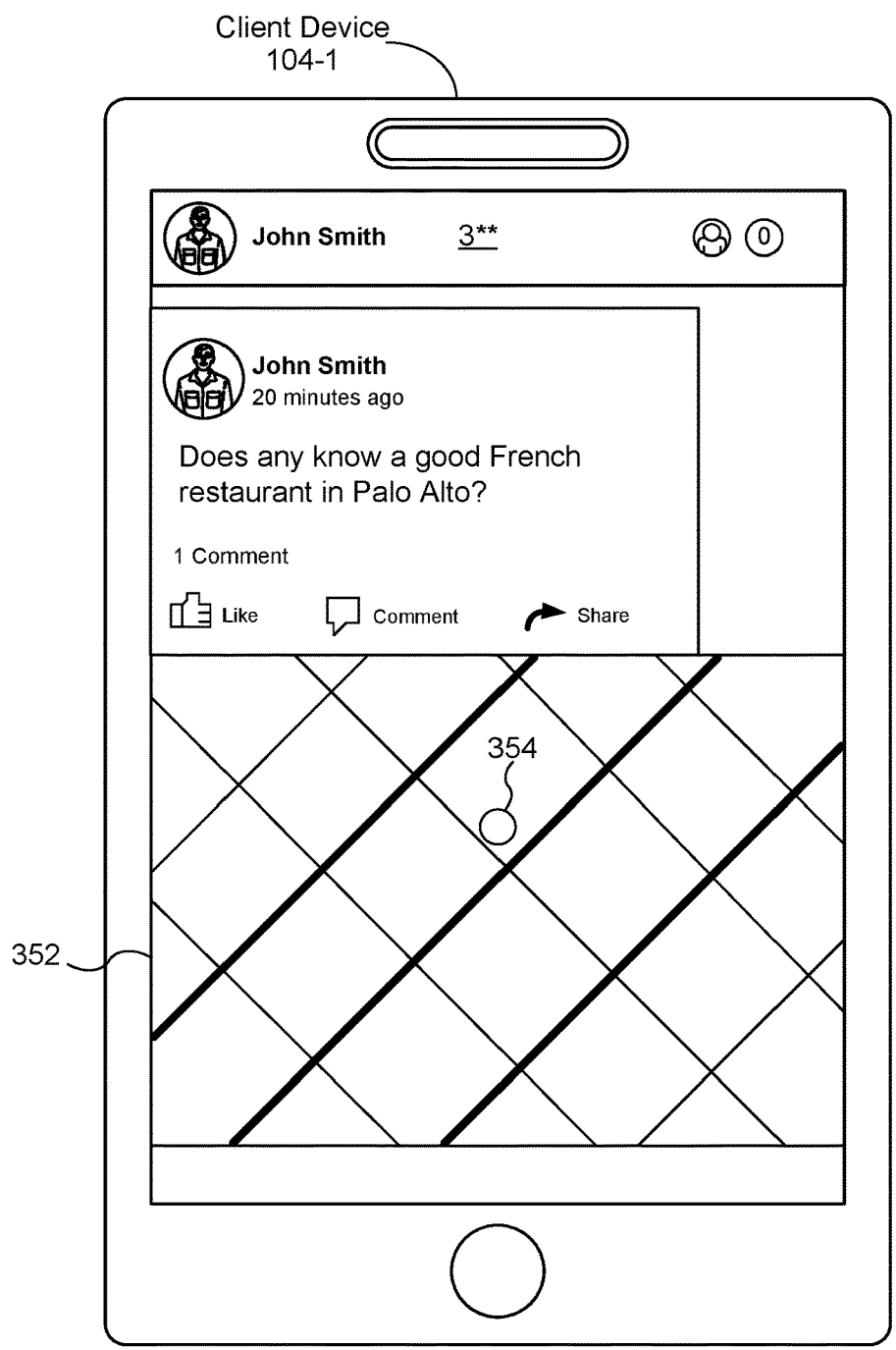
Figure 4A:
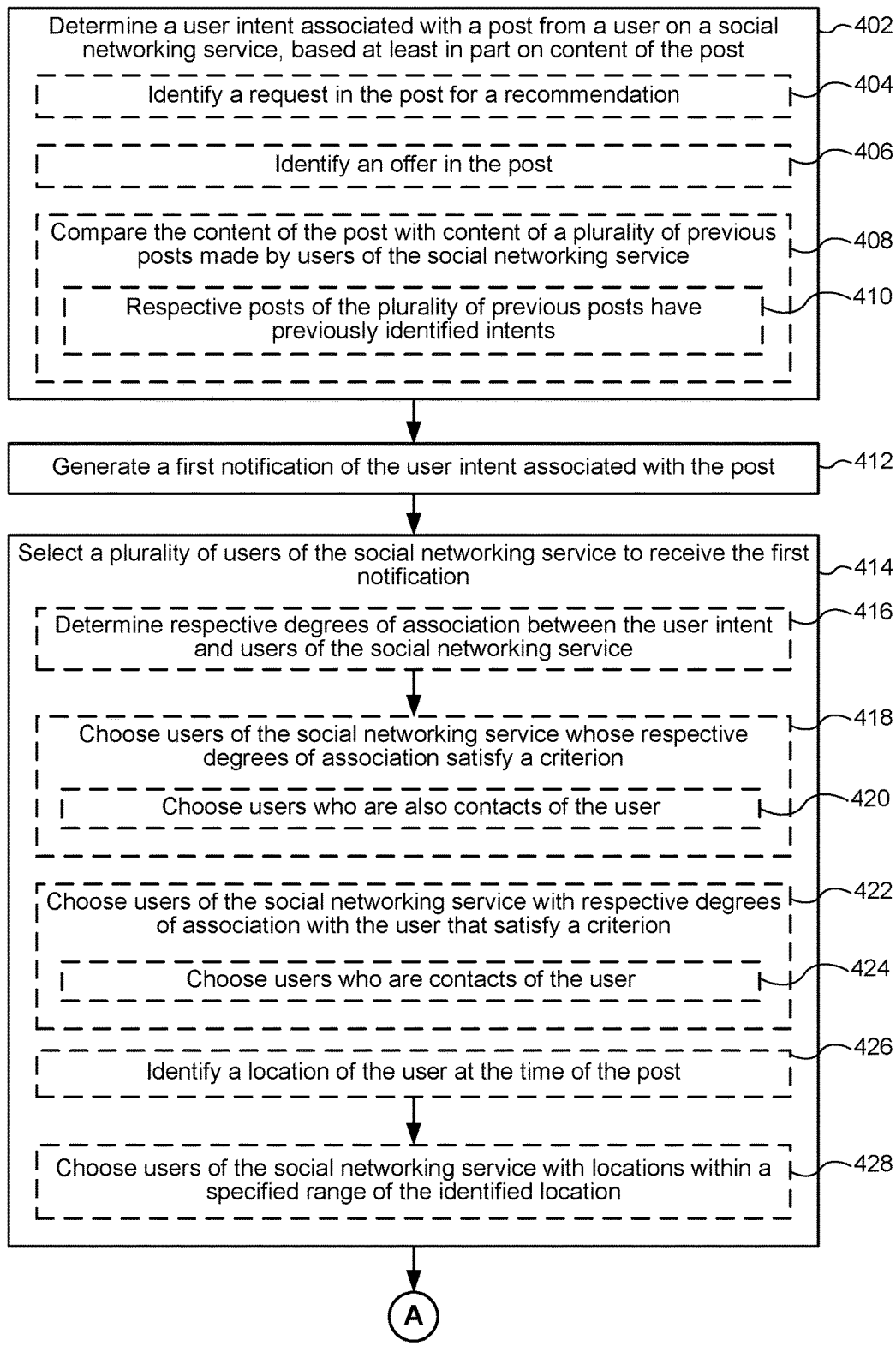
FIGS. 4A-4C are flow diagrams illustrating a method of providing notifications to users of a social networking system, in accordance with some embodiments.
Figure 4B:
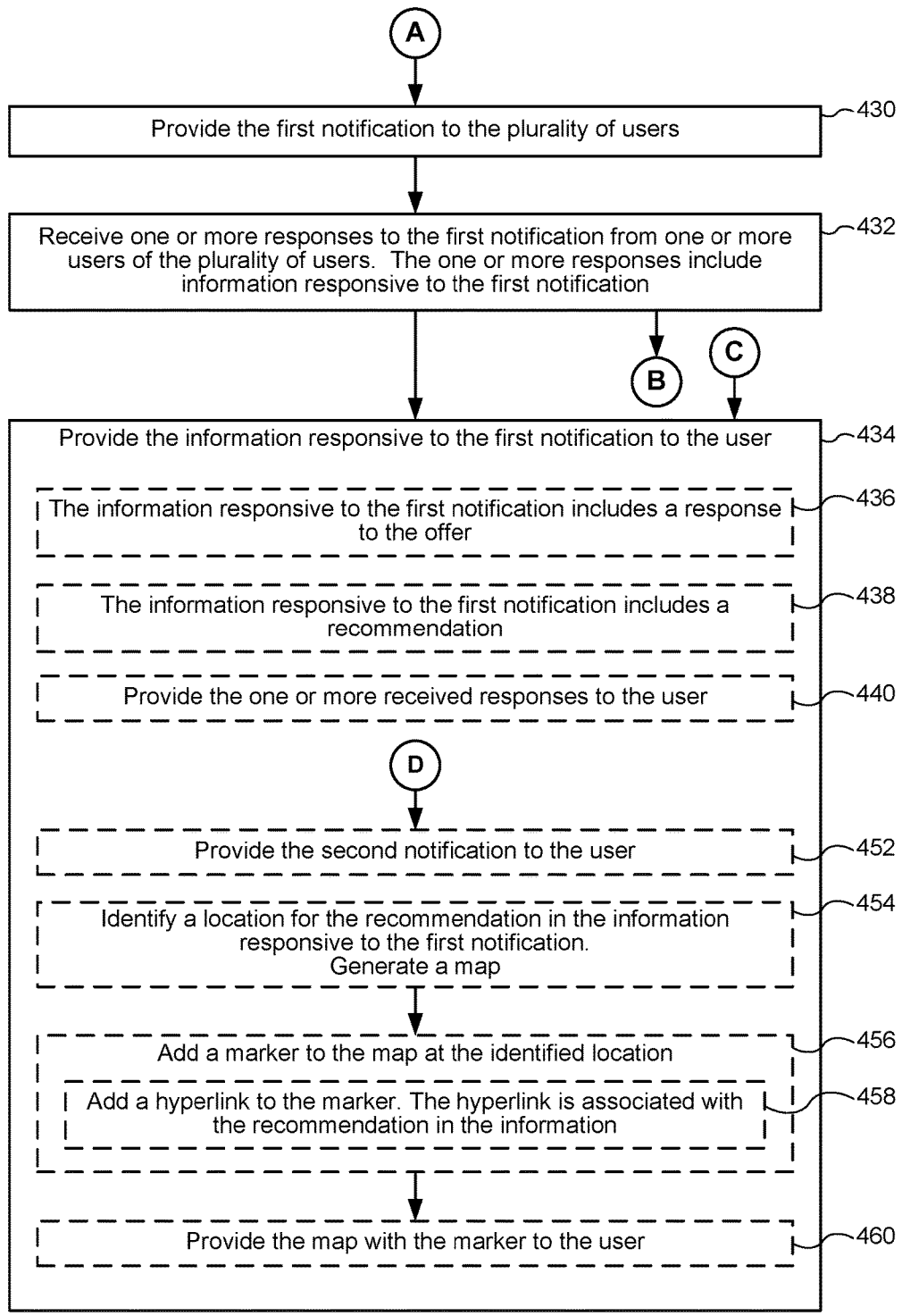
Figure 4C:
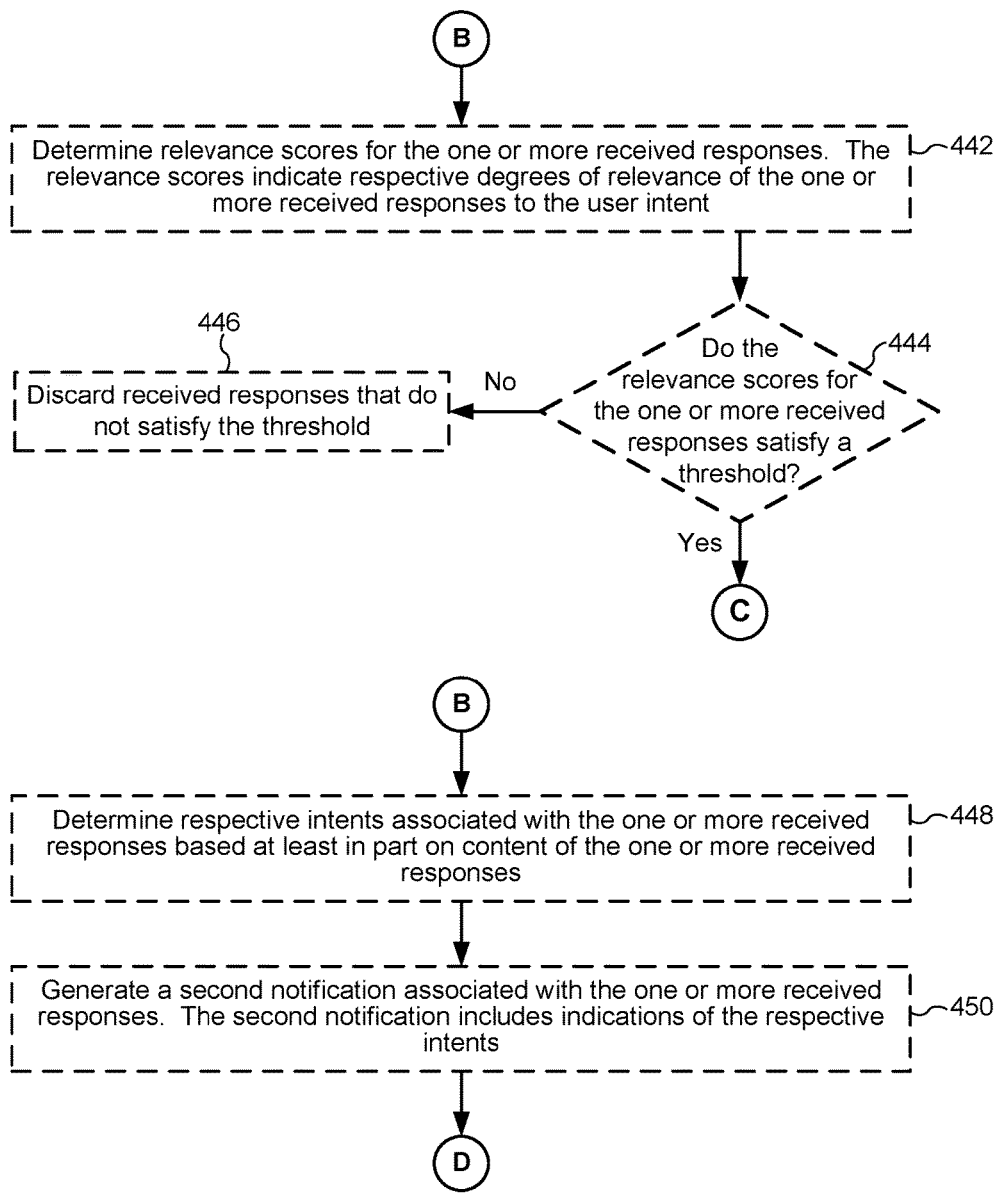

FIGS. 3A-3F illustrate exemplary GUIs for providing notifications to respective client devices (e.g., client devices 104-1, 104-2, . . . 104-n, FIG. 1; client device 240, FIG. 2B) of users (e.g., users 102-1, 102-2, . . . 102-n, FIG. 1) of a social networking service. In some embodiments, the GUIs shown may be provided by an application for the social networking service executing on the client device (e.g., social networking client module 280, FIG. 2B). Alternatively, in some embodiments, the GUIs shown may be provided on a webpage (e.g., displayed by browser module 278, FIG. 2B) for the social networking service loaded by the client device. Referring to FIG. 3A, the GUI illustrates a home page for the social networking service displayed on a display (e.g., display 252, FIG. 2B) of a client device 104-1. The home page is associated with a user account (e.g., an account for user 102-1, i.e., John Smith). In some embodiments, the home page includes a banner section 302. The banner section 302 may include a profile button 304 (e.g., to adjust profile settings), a notification button 306 (e.g., indicates reception of a notification), and a profile picture 308 of the user. In some embodiments, the home page may further include a post section 310. The post section 310 may include a post bar 312 within which the user may compose a post and a post button 314 for posting the post to the social networking service. In some embodiments, the home page may further include a news section 316. The news section 316 may include posts (e.g., post 318) made by users of the social networking service. The GUIs in these figures are used to illustrate the processes described below, including the method 400 (FIGS. 4A-4C). While FIGS. 3A-3F illustrate examples of GUIs, in other embodiments, one or more GUIs display user-interface elements in arrangements distinct from the embodiments of FIGS. 3A-3F. Moreover, one or more GUIs may lack feature(s) described above for ease of illustration.

FIGS. 4A-4C are flow diagrams illustrating a method of providing notifications to users of a social networking system, in accordance with some embodiments. The steps of the method 400 may be performed by a social networking system (e.g., social networking system 108, FIG. 1; server system 200, FIG. 2A). FIGS. 4A-4C correspond to instructions stored in a computer memory or computer readable storage medium (e.g., memory 206 of the server system 200). For example, the operations of method 400 are performed, at least in part, by a social networking server module (e.g., social networking server module 228, FIG. 2A) and a text analyzing module (e.g., text analyzing module 226, FIG. 2A). In some embodiments, the steps of the method 400 may be performed by any combination of client device (e.g., a client device 104, FIG. 1; client device 240, FIG. 2B) and the social networking system. To assist with describing the method 400, the method 400 will be described with reference to the exemplary GUIs illustrated in FIGS. 3A-3F.

In performing the method 400, the social networking system determines (402) a user intent associated with a post from a user (e.g., user 102-1, FIG. 1) on a social networking service, based at least in part on content of the post. In some embodiments, when determining the user intent associated with the post, the social networking system may identify (404) a request in the post for a recommendation (e.g., a recommendation for a restaurant). In some embodiments, when determining the user intent associated with the post, the social networking system may identify (406) an offer in the post (e.g., offering to sell a good or service). In some embodiments, the content of the post includes text in the post (e.g., words and/or phrases that compose the post). In some embodiments, the content of the post includes other information such as locational tags (e.g., the user may tag or otherwise identify his or her location in the post) and user tags (e.g., the user may tag or otherwise identify one or more contacts in the post).

In some embodiments, using a text analyzing program (e.g., text analyzing module 226, FIG. 2A), the social networking system may analyze the text in the post to determine the user intent associated with the post (e.g., analyze text in response to the user 102-1 selecting 322 post button 314, FIG. 3A). For example, referring to FIG. 3A, the social networking system may analyze question 320 posed by John Smith (e.g., user 102-1). As shown, the question 320 reads, "Does anyone know a good French restaurant in Palo Alto?" In some embodiments, the social networking system may use natural language processing to analyze the question 320. Those skilled in the art will appreciate that various text analyzing programs may be used to analyze the question 320.

In some embodiments, the text analyzing program may include a text analysis model. In some embodiments, the text analysis model may direct the social networking system to identify one or more locations in the text. For example, referring to FIG. 3A, the social networking system may identify that the text includes a location, Palo Alto. In some circumstances and situations, the identified location may potentially relate to two or more locations (e.g., Palo Alto, Calif. and Palo Alto, Tex.). In these circumstances or situations, the social networking system may further analyze the text and/or identify a current location of the client device (e.g., the client device 104-1 may be located in or near Palo Alto, Calif. when the post is made by the user) to resolve the ambiguity and determine the intended location. In addition, the social networking system may analyze previous posts made within a relevant time period by the user (e.g., the user 102-1 may have posted earlier in the day, "I love visiting California, it's my favorite state") to determine the intended location.

In some embodiments, the text analysis model may direct the social networking system to identify one or more punctuation marks in the text. In this way, the social networking system may determine that a question (e.g., a request for a recommendation) is being made by the user (e.g., John Smith). For example, referring to FIG. 3A, the social networking system may identify that the question 320 includes a question mark.

In addition, in some embodiments, the text analysis model may direct the social networking system to identify one or more trigger words and/phrases in the text. In some embodiments, words and phrases such as "does anyone know," "what is," and other questioning terms may be a first category of trigger words and/or phrases associated with a request for a recommendation. In another example, words and phrases such as "does anyone want," "what will you give me," "I'm selling my," and other terms likely to be included in an offer may be a second category of trigger words and/or phrases associated with an offer.

In some embodiments, when determining the user intent associated with the post (e.g., the question 320, FIG. 3A), the social networking system may compare (408) the content of the post with content of a plurality of previous posts (or simply a previous post) made by users of the social networking service (e.g., posts 240, FIG. 2A). Respective posts of the plurality of previous posts may have previously identified intents (410) (e.g., as stored in intent log 224, FIG. 2A). As such, the social networking system may match one or more respective posts of the plurality of previous posts with the post (e.g., the question 320, FIG. 3A) using the previously identified intents. For example, a previous post by a respective user of the social networking service may have been, "does anyone know a nice golf course near Salt Lake City?" In order to determine a user intent associated with the post, the social networking system may have asked, "would you like recommendations for golf courses near Salt Lake City?" In response to receiving an affirmative answer from the respective user, the social networking system may have logged that "does anyone know" may be associated with the user intent for a requested recommendation. Accordingly, referring to FIG. 3A, the social networking system may compare the question 320 to the previous post regarding golf courses to determine the user intent associated with the question 320 (e.g., seeking a recommendation for a restaurant).

In some embodiments, the text analysis model may include or access the plurality of previous posts and the previously identified intents. In addition, in accordance with a determination that a number of analyzed posts satisfy a threshold, the social networking system may update the text analysis model. For example, the updated text analysis model may include updated trigger words and/phrases. In addition, the updated text analysis model may include an updated plurality of previous posts made by users of the social networking service and updated identified intents for the updated plurality of previous posts.

In some embodiments, referring to FIG. 3A, in response to user selection 322 of post button 314, the social networking system may receive a request from the client device 104-1 for a notification feature provided by the social networking service. In response, the social networking system may generate a first notification (discussed below). In some embodiments, prior to the social networking system receiving the request, the social networking system (or the client device) may determine whether or not the user wants to launch the notification feature (e.g., present a yes-or-no question to the user in the application or the webpage on the client device 104-1).

The social networking system generates (412) a first notification of the user intent associated with the post (e.g., the question 320, FIG. 3A). In some embodiments, the social networking system may generate the first notification in response to receiving the request from the client device (e.g., the client device 104-1). In some embodiments, the social networking system may generate the first notification in accordance with a determination that the user intent associated with the post satisfies a user-intent threshold. For example, the social networking system may generate the first notification in accordance with a determination that the user intent associated with the post is an offer. In another example, the social networking system may generate the first notification in accordance with a determination that the user intent associated with the post is a request for a recommendation.

The social networking system selects (414) a plurality of users of the social networking service to receive the first notification. In some embodiments, when selecting the users to receive the first notification, the social networking system may determine (416) respective degrees of association between the user intent and users of the social networking service. For example, to determine a respective degree of association between the user intent and a respective user of the social networking service, the social networking system may determine a connection (e.g., an edge) between the user (e.g., a first node) and the respective user (e.g., a second node) of the social networking service in accordance with the determined user intent (e.g., user intent is for a French restaurant recommendation, FIG. 3A). In some embodiments, the connection between the first node and the second node may be an indirect connection. For example, the respective user (e.g., the second node) may have recently "checked in" to a location relevant to the user intent (e.g., French Restaurant X in Palo Alto, Calif.) (e.g., a third node). As such, the social networking system may log a connection (e.g., a first edge) between the respective user (e.g., the second node) and the location (e.g., French Restaurant X) (e.g., the third node). In addition, the social networking system may log (e.g., temporarily form) multiple connections (e.g., multiple second edges) between the user (e.g., the first node) and each potentially relevant location (e.g., each French restaurant in Palo Alto), including the third node. Consequently, the social networking system may log the indirect connection between the user (e.g., the first node) and the respective user (e.g., the second node) via French Restaurant X (e.g., the third node). Based on this connection, the social networking system may select the respective user to receive the first notification, because the respective user's action (e.g., "checking in" to French Restaurant X) creates a degree of association between the user intent and the respective user. The social networking system may perform the connection analysis for respective users of the social networking service. Moreover, "checking in" is simply one of many ways of creating an indirect connection. Edges and nodes are discussed in further detail above with reference to FIG. 2A.

In some embodiments, after determining the respective degrees of association between the user intent and one or more users of the social networking service, the social networking system may choose (418) users of the social networking service whose respective degrees of association satisfy a criterion. In some embodiments, the criterion may be based at least in part on location (e.g., the social networking system may connect nodes based on connection information associated with location). For example, referring to FIG. 3A, the social networking system may choose users who have visited, lived, and/or currently live in Palo Alto (and in some embodiments surrounding areas, e.g., a predetermined mile radius around Palo Alto). In some embodiments, as an alternative or in addition, the criterion may be based at least in part on activity (e.g., the social networking system may connect nodes based on connection information associated with activity). For example, the social networking system may choose users who have visited, "checked in," "liked," "favorited," etc.) a location relevant to the user intent (e.g., a French restaurant in Palo Alto, and in some embodiments French restaurants in the surrounding areas). In some embodiments, as an alternative or in addition, the criterion may be based at least in part on time. For example, the social networking system may choose users who have visited Palo Alto within a threshold period of time and/or users who have visited a French restaurant in Palo Alto (and in some embodiments in the surrounding areas) within a threshold period of time. In some embodiments, the criterion is based at least on part on a combination of location, activity, and/or time. Moreover, the criterion may be based on other information (e.g., other portions of the connection information 220, FIG. 2A). Connection information 220 is discussed in further detail above with reference to FIG. 2A.

When choosing the users of the social networking service whose respective degrees of association satisfy the criterion, the social networking system may choose (420) users who are also contacts of the user and thus are directly connected to the user in the social networking service. Using the example from above, the social networking system may determine that an indirect connection exists between the user (e.g., the first node) and the respective user (e.g., the second node) via the French Restaurant X (e.g., the third node). Thereafter, the social networking system may also determine a direct connection (e.g., relationship) between the user (e.g., the first node) and the respective user (e.g., the second node). In this way, the social networking system may further limit a number of instances of the first notification provided. Moreover, the user may trust recommendations from contacts as opposed to recommendations from non-contacts.

In some embodiments, when selecting the users to receive the first notification, the social networking system may choose (422) users of the social networking service with respective degrees of association with the user that satisfy a criterion. To determine a respective degree of association with the user, the social networking system may determine a connection (e.g., an edge) between the user (e.g., a first node) and a respective user (e.g., a second node) of the social networking service. In some embodiments, the connection (e.g., the edge) may be a direct connection (e.g., an edge connecting a pair of nodes represents a relationship (e.g., friends, relatives, etc.) between the pair of nodes), such that the two users are contacts. In some embodiments, the criterion may be satisfied by direct connections. In some embodiments, the social networking system may choose (424) users who are contacts of the user. Edges and nodes are discussed in further detail above with reference to FIG. 2A.

In some embodiments, when selecting the users to receive the first notification, the social networking system may identify (426) a location of the user at the time of the post. In some circumstances, the social networking system may not determine a location of the user from the post (e.g., the user may post "Where can I find good French food."). In these circumstances, the social networking system may determine the location of the user using other information. For example, the user may have "checked in" to the location (or near the location) prior to making the post (e.g., "checked in" 10 minutes prior to making the post). In another example, the social networking system may receive location information from the client device of the user (e.g., receive location information via a location detection device 262 of the client device 240, FIG. 2B).

Furthermore, when selecting the users to receive the first notification, the social networking system may choose (428) users of the social networking service with locations within a specified range of the identified location. For example, the social networking system may choose users who have visited, lived, and/or currently are visiting or live in the location (and in some embodiments surrounding areas). In some embodiments, the social networking system may limit the selection to users who have visited, lived, currently are visiting, and/or currently live in the location within a recent period of time (e.g., within the last year). In some embodiments, the period of time may vary depending on a nature of the location (e.g., the period of time may expand when the identified location is a foreign city).

In performing the method 400, the social networking system provides (430, FIG. 4B) the first notification to the plurality of users. For example, the social networking system may provide respective instances of the first notification to respective users of the plurality of users. Referring to FIG. 3B, the social networking system may provide User_17 with a respective instance of the first notification. In some embodiments, to view the first notification, the User_17 may interact with a display of client device 104-2 to select 324 a notification button 326 displayed on the display.

Furthermore, in some embodiments, the first notification may include a first portion and a second portion. In some embodiments, the first portion of the first notification may ask each of the plurality of selected users whether or not they want to participate (e.g., whether or not they want to provide a recommendation). For example, referring to FIG. 3C, the first portion 328 of the first notification 330 may relate to the question 320 (FIG. 3A) and may ask "Would you like to help John find a French restaurant in Palo Alto?" In another example, the first portion 328 of the first notification 330 may relate to a node (e.g., the third node) that forms an indirect connection between the user (e.g., the first node) and a respective user (e.g., the second node). For example, using the example from above, the respective user (e.g., the second node) may have recently "checked in" to the French Restaurant X. Accordingly, the first notification 330 may ask the respective user, "Would you like to recommend the French Restaurant X in Palo Alto you recently visited?" In some embodiments, the social networking system may skip the first portion 328 and simply present the second portion 338 of the first notification 330 to the respective user (FIG. 3D).

In some embodiments, in accordance with a determination that a respective user of the plurality of users declines to participate (e.g., selection of No-button 332, FIG. 3C), the social networking system may not present the second portion 338 of the first notification 330 to the respective user. However, in accordance with a determination that the respective user of the plurality of users accepts (selection 334 of Yes-button 336, FIG. 3C), the social networking system may present the second portion 338 of the first notification 330 to the respective user. Referring to FIG. 3D, User_17 may provide a recommendation 340 in the second portion 338 of the first notification 330. User_17 may interact with the display of client device 104-2 to select 342 a share button 344 displayed on the display.

After providing the first notification to the plurality of users, the social networking system receives (432) one or more responses to the first notification from one or more users of the plurality of users. The one or more responses may include information responsive to the first notification. The social networking system provides (434) the information responsive to the first notification to the user. In some embodiments, the information responsive to the first notification includes a response to the offer (436). In some embodiments, the information responsive to the first notification includes a recommendation (438). For example, referring to 3D, User_17 recommends French Restaurant X on University Avenue in Palo Alto. As such, the recommendation by User_17 includes information responsive to the first notification (i.e., John was seeking recommendations for French restaurant's in Palo Alto). In response to receiving the recommendation from the client device 104-2, the social networking system may provide the recommendation to the user. In some embodiments, the social networking system may provide (440) the one or more received responses to the user (e.g., the social networking system may not filter responses).

In some embodiments, prior to providing the information responsive to the first notification to the user, the social networking system may determine (442, FIG. 4C) relevance scores for the one or more received responses. The relevance scores indicate respective degrees of relevance of the one or more received responses to the user intent. The social networking system may determine relevance scores to filter out irrelevant (e.g., unhelpful) responses.

For example, when the user intent is for a restaurant recommendation, the social networking system may assign no score (or a zero score) to a received response that lacks a restaurant (i.e., no degree of relevance). In another example, the social networking system may assign a first score to a received response that includes a restaurant but does not address or conform to the user intent for the post (i.e., a first degree of relevance). For example, referring to FIG. 3A, the received response may say "too bad Palo Alto doesn't have a John's Steaks, I love that place." Such as response does not address or conform to (i.e., is not relevant to) the user intent of the question 302 as the response does not actually provide the requested recommendation. In another example, the social networking system may assign a second score (e.g., higher than the first score) to a received response that includes a restaurant in a relevant geographic area (i.e., a second degree of relevance). For example, referring to FIG. 3D, User_17 recommends French Restaurant X located on University Avenue in Palo Alto. The social networking system may assign the second score to the received response as the received response addresses and conforms to the question 302 (FIG. 3A). In some embodiments, the social networking system may assign a third score (e.g., higher than the first and second scores) to a received response that is particularly relevant and/or useful (i.e., a third degree of relevance). For example, a received response from a respective user may include reviews of multiple French restaurants in Palo Alto.

In addition, the social networking system may determine (444) that the relevance scores for the one or more received responses satisfy a threshold. In some embodiments, the threshold may be associated with the respective degrees of relevance and/or the determined scores. For example, the social networking system may set the threshold such that responses with respective second degrees of relevance and above (or first degrees of relevance and above, or third degrees of relevance) satisfy the threshold.

In some embodiments, in accordance with determining that the relevance scores for received responses do not satisfy the threshold (444—No), the social networking system may discard (446) received responses that do not satisfy the threshold. For example, the social networking system may provide the first notification to a group of users of the social networking service. The social networking system may receive responses from at least some of the group. Out of those received responses, all or some may not be relevant to the question posed/asked by the user. For example, the social networking system may discard received responses of "have fun in Palo Alto!," "French food is the best!," and the like. Moreover, the social networking system may discard received responses with respective first degrees of relevance when the threshold is set to a second degree of relevance and above, or discard responses with respective first or second degrees of relevance when the threshold is set to a third degree of relevance.

In some embodiments, in accordance with determining that the relevance scores for the one or more received responses satisfy the threshold (444—Yes), the social networking system may provide (434) the information responsive to the first notification (i.e., the information in responses determined to be relevant to the user intent) to the user. For example, referring to FIG. 3E, the social networking system provides the response by User_17 to John Smith. When providing the response to John Smith, the social networking system may include the response by User_17 in a response section 346 of the post 348.

In some embodiments, the social networking system may determine (448, FIG. 4C) respective intents associated with the one or more received responses based at least in part on content of the one or more received responses (e.g., in a similar manner as for the user intent for the post). For example, referring to FIG. 3D, the social networking system may determine that the received response from User_17 is a recommendation by analyzing the text (e.g., analyzing the text for one or more restaurant names and for a relevant location). In some embodiments, the social networking system may compare content in a received response with connection information (e.g., connection information 220, FIG. 2A). For example, the social networking system may compare a restaurant name in a received response with one or more relevant pages on the social networking service. Referring to FIG. 3D, the social networking system may match the text, "French Restaurant X," with a page (e.g., an account, a node) of French Restaurant X in the social networking service. In this way, the social networking system may determine that a given recommendation in a received response is relevant and valid. In another example, the social networking system may compare a restaurant name in a received response with a webpage distinct from the social networking service (e.g., the social networking system may perform a search on the World Wide Web).

Furthermore, the social networking system may determine whether the respective intents associated with the one or more received responses match the user intent. In some embodiments, in accordance with a determination that the respective intents associated with received responses do not match (e.g., do not relate to) the user intent, the social networking system may discard the received responses that do not match the user intent. In some embodiments, the social networking system may determine the respective intents associated with the one or more received responses when determining the relevance scores. For example, received responses with respective intents that do not match the user intent may receive a reduced score as compared to received responses with respective intents that match the user intent.

In some embodiments, in accordance with a determination that the respective intents associated with the one or more received responses match (e.g., relate to) the user intent, the social networking system may provide (434) the information responsive to the first notification to the user.

Furthermore, in some embodiments, the social networking system may generate (450) a second notification associated with the one or more received responses. The second notification includes indications of the respective intents associated with the one or more received responses. In some embodiments, the social networking system may generate the second notification in accordance with a determination that the respective intents associated with the one or more received responses match (e.g., relate to) the user intent. Alternatively or in addition, in some embodiments, the social networking system may generate the second notification in accordance with a determination that the relevance scores for the one or more received responses satisfy the threshold (444—Yes).

In some embodiments, when providing the information responsive to the first notification to the user, the social networking system may provide (452, FIG. 4B) the second notification to the user. For example, referring to FIG. 3E, the client device 104-1 may receive the second notification from the social networking system. In response to receiving the second notification, the client device 104-1 may signal reception of the second notification to the user 102-1 (i.e., John Smith) with an indicator 350 in the notification button 306. The user 102-1 may interact with a display (e.g., touch or click on) of the client device 104-1 to view the second notification (e.g., which includes the received response from User_17 or information from the received response from User_17). Although FIG. 3E shows a single notification in the notification button 306, a number in the indicator may reflect a number of received responses.

In some embodiments, the request in the post is for a recommendation in a geographic area. For example, referring to FIG. 3A, the question 320 requests a restaurant recommendation in Palo Alto, Calif., USA. In some embodiments, the recommendation in the information responsive to the first notification is specific to the geographic area. For example, referring to FIG. 3D, the response 340 by User_17 relates to a restaurant in Palo Alto.

In some embodiments, the social networking system may identify (454) a location for the recommendation in the information responsive to the first notification. In some embodiments, the social networking system may identify the location using connection information (e.g., connection information 220, FIG. 2A). For example, the social networking system may compare a restaurant name in a received response with one or more relevant pages on the social networking service. The social networking system may find a location associated with a page if the compare operation is successful (e.g., a match is found). In some embodiments, the social networking system may perform a search (e.g., on the World Wide Web) to identify the location for the recommendation.

In addition, the social networking system may generate (454) a map and add (456) a marker (e.g., marker 354, FIG. 3F) to the map (e.g., map 352, FIG. 3F) at the identified location. In some embodiments, the social networking system may add (458) a hyperlink to the marker. The hyperlink may be associated with the recommendation in the information responsive to the first notification. For example, the hyperlink may be for a page (e.g., a webpage) of the recommendation (e.g., recommendation 340, FIG. 3D) on the social networking service (e.g., the recommendation may be a node). In another example, the hyperlink may be for a webpage of the recommendation distinct from pages of the social networking service.

In some embodiments, the social networking system may provide (460) the map with the marker to the user. For example, referring to FIG. 3F, the social networking system may generate a map 352, add a marker 354 at the identified location, and provide the map 352 to the client device 104-1 for display. In some embodiments, the social networking system may add a plurality of markers to the map that are associated with respective received responses. Moreover, the social networking system may adjust a size of the map in accordance with identified locations for the respective received responses. For example, the social networking system may zoom out when the identified locations span a larger area (e.g., identified locations span multiple cities) as compared to a smaller area (e.g., a single city).

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   determining a user intent associated with a post from a user on a social networking service, based at least in part on content of the post;
   generating a first notification of the user intent associated with the post;
   selecting a plurality of users of the social networking service to receive the first notification;
   providing the first notification to the plurality of users; and
   after providing the first notification to the plurality of users:
      receiving one or more responses to the first notification from one or more users of the plurality of users, the one or more responses including information responsive to the first notification;
      determining relevance scores for the one or more received responses, the relevance scores indicating respective degrees of relevance of the one or more received responses to the user intent; and
      in accordance with determining that the relevance scores for the one or more received responses satisfy a threshold, providing the information responsive to the first notification to the user.

2. The method of claim 1, wherein selecting the plurality of users of the social networking service to receive the first notification comprises:
   determining respective degrees of association between the user intent and users of the social networking service; and
   choosing users of the social networking service whose respective degrees of association satisfy a criterion.

3. The method of claim 2, wherein choosing the users of the social networking service whose respective degrees of association satisfy the criterion comprises choosing users who are also contacts of the user.

4. The method of claim 1, wherein selecting the plurality of users of the social networking service to receive the first notification comprises choosing users of the social networking service with respective degrees of association with the user that satisfy a criterion.

5. The method of claim 4, wherein choosing the users of the social networking service with respective degrees of association with the user that satisfy the criterion comprises choosing users who are contacts of the user.

6. The method of claim 1, wherein selecting the plurality of users of the social networking service to receive the first notification comprises:
identifying a location of the user at the time of the post; and
choosing users of the social networking service with locations within a specified range of the identified location.

7. The method of claim 1, further comprising:
determining respective intents associated with the one or more received responses based at least in part on content of the one or more received responses; and
generating a second notification associated with the one or more received responses, the second notification including indications of the respective intents;
wherein providing the information responsive to the first notification to the user comprises providing the second notification to the user.

8. The method of claim 1, wherein providing the information responsive to the first notification to the user comprises providing the one or more received responses to the user.

9. The method of claim 1, wherein determining the user intent associated with the post comprises comparing the content of the post with content of a plurality of previous posts made by users of the social networking service.

10. The method of claim 9, wherein respective posts of the plurality of previous posts have previously identified intents.

11. The method of claim 1, wherein:
determining the user intent associated with the post comprises identifying an offer in the post; and
the information responsive to the first notification includes a response to the offer.

12. The method of claim 1, wherein:
determining the user intent associated with the post comprises identifying a request in the post for a recommendation; and
the information responsive to the first notification includes a recommendation.

13. The method of claim 12, wherein:
the request is for a recommendation in a geographic area; and
the recommendation in the information responsive to the first notification is specific to the geographic area.

14. The method of claim 12, further comprising, identifying a location for the recommendation in the information responsive to the first notification, wherein providing the information responsive to the first notification to the user comprises:
generating a map;
adding a marker to the map at the identified location; and
providing the map with the marker to the user.

15. The method of claim 14, wherein providing the information responsive to the first notification to the user further comprises adding a hyperlink to the marker, the hyperlink being associated with the recommendation in the information.

16. The method of claim 1, further comprising:
determining respective intents associated with the one or more received responses based at least in part on content of the one or more received responses; and
wherein determining relevance scores for the one or more received responses comprises assigning a higher relevance score to a first received response whose respective intent matches the user intent than a second received response whose respective intent does not match the user intent.

17. A server system, comprising:
one or more processors; and
memory storing one or more programs for execution by the one or more processors, the one or more programs including instructions for:
determining a user intent associated with a post from a user on a social networking service, based at least in part on content of the post;
generating a first notification of the user intent associated with the post;
selecting a plurality of users of the social networking service to receive the first notification;
providing the first notification to the plurality of users; and
after providing the first notification to the plurality of users:
receiving one or more responses to the first notification from one or more users of the plurality of users, the one or more responses including information responsive to the first notification;
determining relevance scores for the one or more received responses, the relevance scores indicating respective degrees of relevance of the one or more received responses to the user intent; and
in accordance with determining that the relevance scores for the one or more received responses satisfy a threshold, providing the information responsive to the first notification to the user.

18. The system of claim 17, wherein selecting the plurality of users of the social networking service to receive the first notification comprises:
determining respective degrees of association between the user intent and users of the social networking service; and
choosing users of the social networking service whose respective degrees of association satisfy a criterion.

19. The system of claim 18, wherein choosing the users of the social networking service whose respective degrees of association satisfy the criterion comprises choosing users who are also contacts of the user.

20. A non-transitory computer-readable storage medium, storing one or more programs configured for execution by one or more processors of a server system, the one or more programs including instructions, which when executed by the one or more processors cause the server system to:
determine a user intent associated with a post from a user on a social networking service, based at least in part on content of the post;
generate a first notification of the user intent associated with the post;
selecting a plurality of users of the social networking service to receive the first notification;
provide the first notification to the plurality of users; and
after providing the first notification to the plurality of users:
receive one or more responses to the first notification from one or more users of the plurality of users, the one or more responses including information responsive to the first notification;
determining relevance scores for the one or more received responses, the relevance scores indicating respective degrees of relevance of the one or more received responses to the user intent; and in accordance with determining that the relevance scores for the one or more received responses satisfy a threshold, provide the information responsive to the first notification to the user.

\* \* \* \* \*

UNITED STATES PATENT AND TRADEMARK OFFICE
CERTIFICATE OF CORRECTION

PATENT NO. : 10,412,037 B2
APPLICATION NO. : 15/439652
DATED : September 10, 2019
INVENTOR(S) : Subba et al.

Page 1 of 1

It is certified that error appears in the above-identified patent and that said Letters Patent is hereby corrected as shown below:

In the Claims

Claim 20, Column 20, Line 55, please delete "selecting a plurality" and insert --select a plurality--;

Claim 20, Column 20, Line 64, please delete "determining relevance" and insert --determine relevance--.

Signed and Sealed this
Third Day of December, 2019

Andrei Iancu
*Director of the United States Patent and Trademark Office*